United States Patent [19]

Raynaud et al.

[11] Patent Number: 4,531,693
[45] Date of Patent: Jul. 30, 1985

[54] SYSTEM FOR PILOTING A MISSILE BY MEANS OF LATERAL GASEOUS JETS AND MISSILE COMPRISING SUCH A SYSTEM

[75] Inventors: Jacques Raynaud, Savigny-sur-Orge; Jean Darmois, Bourg-la-Reine; Pierre Jolivet, Arcueil; Jean Guillot, Chatenay-Malabry, all of France

[73] Assignee: Societe Nationale Industrielle et Aerospatiale, Paris, France

[21] Appl. No.: 550,539

[22] Filed: Nov. 10, 1983

[30] Foreign Application Priority Data

Nov. 29, 1982 [FR] France ............... 82 19996

[51] Int. Cl.³ ............................................. B64C 15/14
[52] U.S. Cl. ....................................... 244/52; 244/3.22
[58] Field of Search ............. 244/3.22, 169, 52, 91, 244/87

[56] References Cited

U.S. PATENT DOCUMENTS

| | | | |
|---|---|---|---|
| 3,013,494 | 12/1961 | Chanut | 244/3.22 |
| 3,145,531 | 8/1964 | Deutsch | 244/169 |
| 3,150,625 | 9/1964 | Brooks | 244/52 |
| 3,304,029 | 2/1967 | Ludtke | 244/3.22 |
| 3,806,063 | 4/1974 | Fitzgerald | 244/3.22 |
| 4,211,378 | 7/1980 | Crepin | 244/3.22 |
| 4,463,921 | 8/1984 | Metz | 244/3.22 |

FOREIGN PATENT DOCUMENTS 2012793 10/1971 Fed. Rep. of Germany ..... 244/3.22

*Primary Examiner*—Galen L. Barefoot
*Attorney, Agent, or Firm*—Fisher, Christen & Sabol

[57] ABSTRACT

A steering system for a missile provided with aerodynamic surfaces such as fins comprises a gas generator and lateral nozzles through which the gas generated by the gas generator emerges. The nozzles are arranged to lie between adjacent pairs of the aerodynamic surfaces, to project beyond the fuselage of the missile and to have an oblong cross-section, the largest dimension of which lies substantially parallel to the longitudinal axis of the missile. The gas flow through the nozzles is controlled by complete or partial closing of the nozzles. The shape and placement of the nozzles minimizes changes in the aerodynamic characteristics of the missile caused by interaction between the gas jets emerging from the nozzles and the flow of air over the aerodynamic surface of the missile.

8 Claims, 11 Drawing Figures

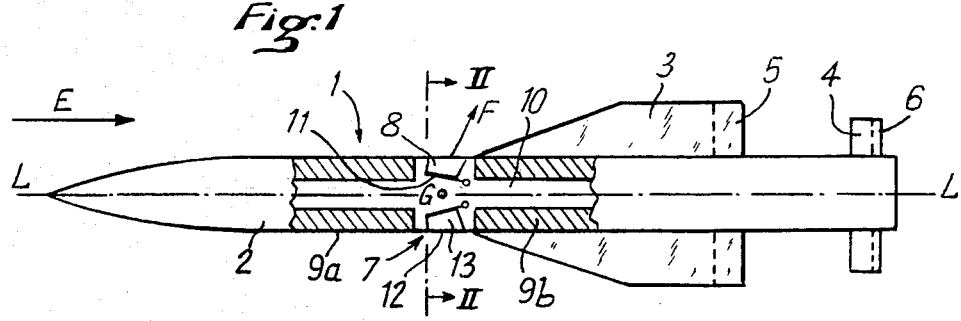
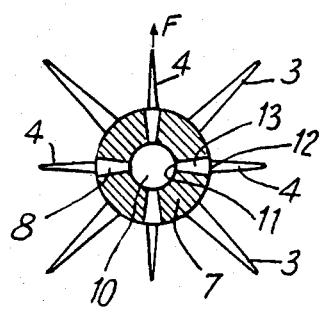
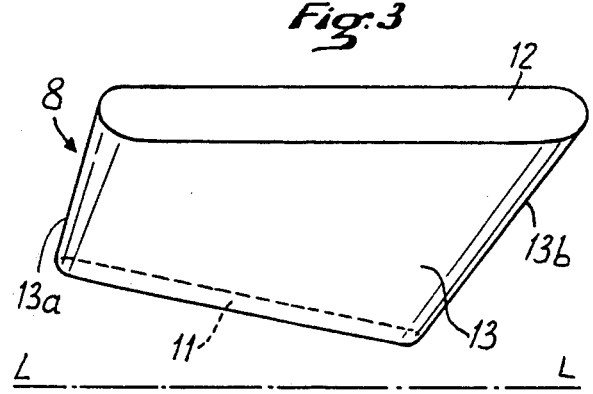
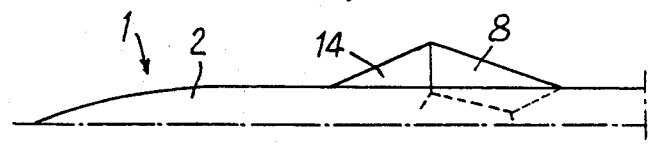
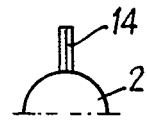
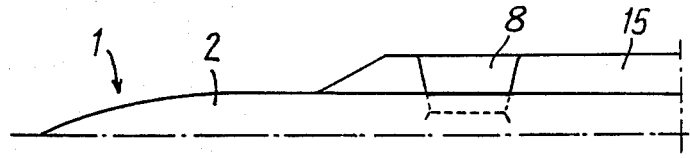

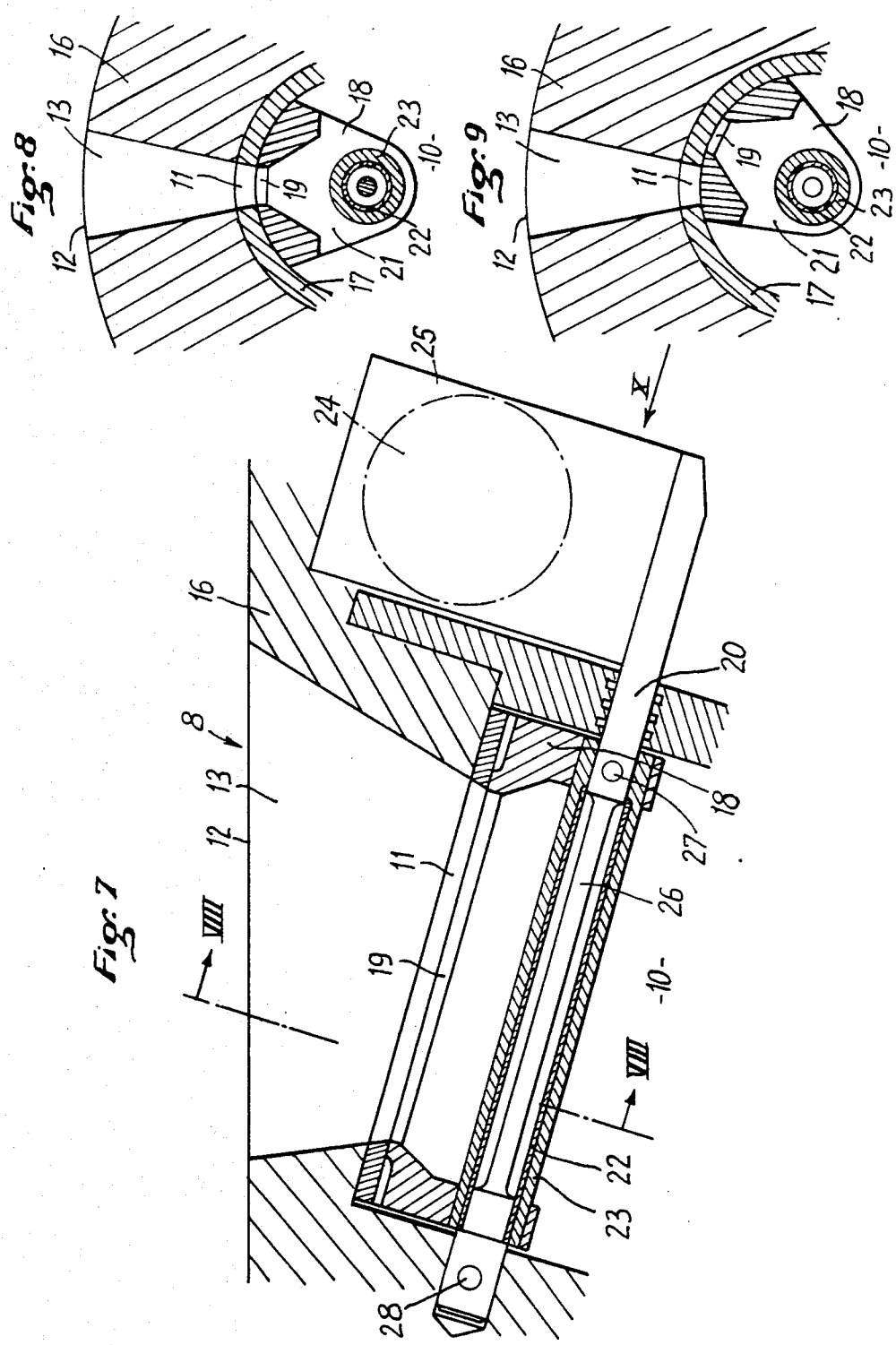

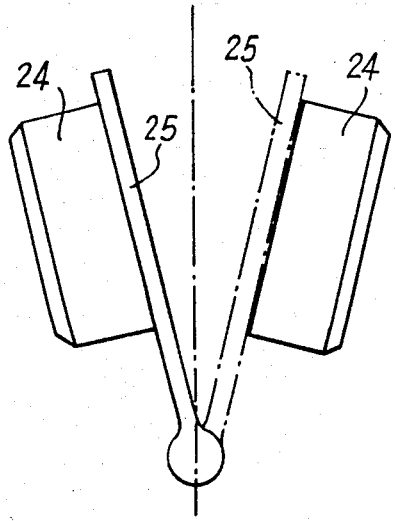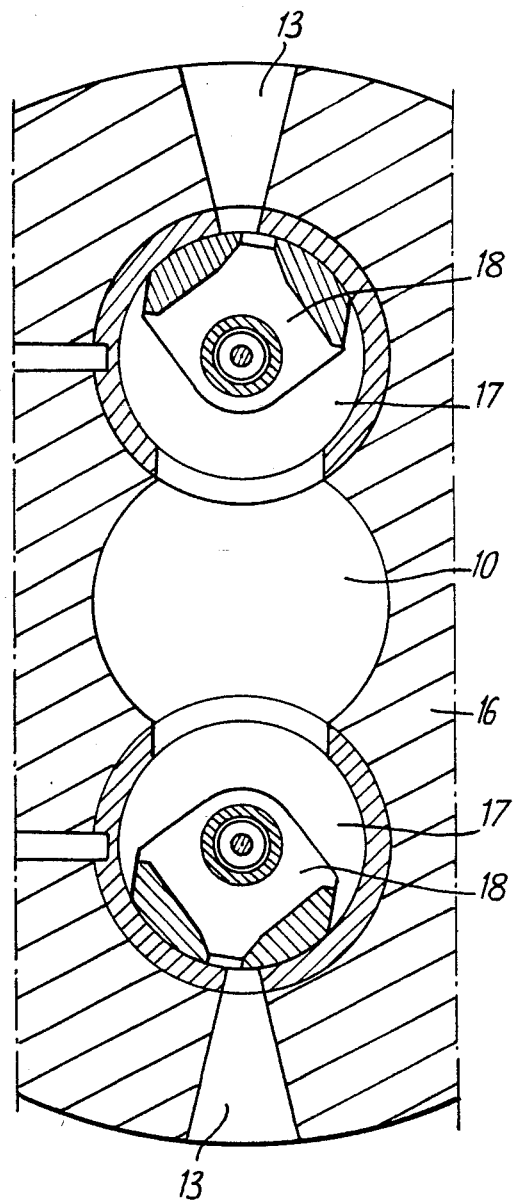

SYSTEM FOR PILOTING A MISSILE BY MEANS OF LATERAL GASEOUS JETS AND MISSILE COMPRISING SUCH A SYSTEM

The present invention relates to a system for piloting a missile by means of lateral gaseous jets and to a missile comprising such a system.

It is already known, particularly when a missile is to be piloted with high load factors, to provide on board this missile lateral nozzles adapted to be supplied with gas either from a gas generator of the main propulsion system, or from a gas generator especially provided to this end. This results in lateral gas jets which create transverse propulsive forces capable of inflecting the path of the missile, rapidly and to a considerable extent. The lines of action of such transverse forces may be arranged to pass through the centre of gravity of the missile, or at least in the vicinity of this centre of gravity and in that case it is said that the missile is piloted in force, the time of response to the order then being particularly rapid. However, this is not an obligation and the lines of action of said transverse forces may pass at points of the axis of the missile which are different from the centre of gravity. Said transverse forces then create, similarly to conventional aerodynamic control surfaces, moments which enable the missile to be controlled in attitude with respect to the centre of gravity.

Systems for piloting missiles by means of lateral gas jets are particularly advantageous, especially due to their low response time. However, they present an important drawback. In fact, during operation thereof, interferences are produced between, on the one hand, the supersonic or subsonic longitudinal aerodynamic flow around the missile, created by the displacement of said missile and, on the other hand, the or each lateral gaseous jet created by said piloting system. This may result in particular in the appearance of parasitic induced flows, the separation of the aerodynamic flow from the fuselage, to the rear of said nozzles, as well as the rearward inflexion of the lateral gaseous jets, their widening and pluming transversely with respect to the axis of the missile. Consequently:

the aerodynamic stability of the missile may vary considerably depending on whether its flight is effected with or without lateral piloting jets, with the result that the control of said missile is considerably influenced thereby;

when, as is usual, the missile comprises wings, stabilizers and/or control surfaces disposed towards its rear part, with a view to giving it a certain lift and to allowing an aerodynamic piloting combined with said piloting by lateral gaseous jets, it may happen, not only that the aerodynamic flow no longer reaches these aerodynamic surfaces, with the result that the lift and aerodynamic manoeuvrability of the missile are affected to the point of becoming zero, but also that it is the inflected lateral gaseous jets which reach these aerodynamic surfaces, with the result that the flight conditions of the missile are completely disturbed, to the point of said missile becoming uncontrollable.

It is an object of the present invention to overcome these drawbacks.

To this end, according to the invention, the system for piloting a missile by means of gaseous jets, comprising a gas generator connected to at least one lateral nozzle associated with a blanking means controlling passage of the gases through said nozzle, is noteworthy in that said nozzle presents an oblong section whose largest dimension is contained at least approximately in a plane passing through the longitudinal axis of said missile, whilst the smallest dimension of said oblong section is directed at least approximately transversely to this plane.

In this way, said nozzle creates a flat gaseous jet, in the form of a layer of small section transversely to the axis of the missile. Consequently, the widening of this jet by the aerodynamic flow has less effect, since the resulting widened jet is much less wide than when the nozzles are of comparable longitudinal and transverse dimensions. Moreover, the separation of the aerodynamic flow by said transverse jet is much more localized and therefore less. This results in that the effects of the interactions between the aerodynamic flow and the or each lateral gaseous jet are reduced.

Furthermore, in the usual case of the missile comprising aerodynamic elements such as wings, stabilizers and/or control surfaces disposed to the rear of said nozzle, it is advantageous to dispose said nozzle so that it lies in an angular peripheral position intermediate between the angular peripheral positions of at least said aerodynamic elements closest to said nozzle, so that the flat jet which emerges therefrom passes between two of them. In this way, the mask effect created by the lateral jets on said aerodynamic elements, where the aerodynamic flow is concerned, is eliminated.

When the missile comprises a plurality of such aerodynamic elements angularly distributed equally on its periphery, it may comprise a plurality of nozzles which are diametrically opposite and disposed in angular positions which are median with respect to two of said consecutive aerodynamic elements closest to said nozzles.

In order further to reduce the flattening and/or pluming of the lateral gaseous jet by the aerodynamic flow, it may be advantageous to provide that the nozzle, possibly associated with aerodynamic means such as stem or sponson, project from the fuselage of the missile, so as to extend guiding of said lateral gaseous jet outside the missile.

Moreover, it will be noted that the oblong form of the nozzle facilitates the design of a blanking means of small dimensions, so that the amplitudes of the movements of this blanking means may be limited, the efforts and manoeuvring times therefore being much reduced. Such a blanking means, which is preferably rotatable, lies towards the throat of the nozzle, outside said nozzle. Each nozzle may be constituted by a divergent, for example formed by a ruled surface, connecting similar oblong inlet and outlet sections. The axis of the rotating blanking means is then advantageously parallel to the largest dimension of the inlet section of the divergent.

The invention will be more readily understood on reading the following description with reference to the accompanying drawings, in which:

FIG. 1 is a schematic longitudinal section of a first missile according to the invention.

FIG. 2 is a schematic transverse section of the first missile according to the invention, along line II—II of FIG. 1.

FIG. 3 is a schematic view in perspective of the diverging section of a nozzle shown in FIGS. 1 and 2.

FIG. 4 is a schematic, partial view of a second missile according to the invention.

FIG. 5 is a partial front view of the missile of FIG. 4.

FIG. 6 shows, in a schematic partial view, a third missile according to the invention.

FIG. 7 is a schematic section through a nozzle of the missile shown in FIGS. 1 and 2 and associated its control mechanism.

FIG. 8 is a partial section along line VIII—VIII in FIG. 7 showing the nozzle in closed position.

FIG. 9 is a partial section along line VIII—VIII in FIG. 7 showing the nozzle in closed position.

FIG. 10 is a view in the direction of arrow X in FIG. 7.

FIG. 11 is a section showing two diametrically opposite nozzles of the missile shown in FIGS. 1 and 2, the nozzles being in neutral position.

In these Figures, like references designate like elements.

Referring now to the drawings, the embodiment of the missile 1 according to the invention, shown schematically in FIGS. 1 and 2, comprises an elongated body 2 having an axis L—L and provided with main aerodynamic surfaces in the form of wings 3 and with stabilizers 4. The wings 3 and stabilizers 4 are provided with control surfaces 5 and 6 respectively. Wings 3 are four in number and they are arranged in pairs, each pair being disposed on opposed sides of the body 2 and in a plane including the axis L—L, the plane containing the two pairs of wings being at right angles to one another. Similarly, the stabilizers 4 are four in number and they are arranged in pairs, each pair being disposed on opposed sides of the body 2 and in a plane including the axis L—L, the planes containing the two pairs of stabilizers being at right angles to one another and bisecting the angles between the planes containing the wings 3.

In the vicinity of the centre of gravity G of the missile 1 there is provided, in body 2, a force-type piloting unit 7 comprising four nozzles 8 arranged in pairs, each pair disposed on opposed sides of the body 2 and in a plane including the axis L—L, each pair of nozzles thus being disposed at opposed ends of a diameter of the missile, the planes containing the two pairs of nozzles being at right angles to one another and bisecting the angles between the planes containing the wings 3. The nozzles 8 are placed between the two combustion chambers 9a and 9b of a gas generator, for example employing solid propellent, and are connected to said chambers 9a and 9b by ducts 10. This arrangement presents the advantage that the fuel of chambers 9a and 9b may be consumed symmetrically, so that the centre of gravity of missile 1 always remains substantially at point G during operation of the gas generator 9a, 9b.

Nozzles 8 are in connection with ducts 10 via an inlet orifice or neck 11 and open to the outside via an outlet orifice 12 of larger cross-section than the inlet orifice 11, said orifices 11 and 12 being connected by a divergent 13 by a diverging section 13, which increases progressively in cross-section from the inlet orifice 11 to the outlet orifice 12.

Each of the nozzles 8 is fitted, adjacent its inlet orifice 11, with a mobile blanking means (not shown in FIGS. 1 and 2) for blanking or disengaging the corresponding nozzle.

In flight without high load factor, action of the force-type piloting unit 7 is not necessary, as the missile 1 may in that case be piloted in conventional manner using its aerodynamic control surfaces 5 and 6. Consequently, if the gas generator 9a, 9b is of the controlled operation type, it may be shut off. If the gas generator 9a, 9b is of the continuously operating type, the gases that it produces may be switched towards the gas circuit of the main propulsion system (not shown) of the missile 1, to participate in the axial thrust thereof; as a variant, the members for blanking two opposite nozzles may be controlled so that the jets of gas which they emit exert on the missile forces of which the resultant is zero: for example, the members for blanking the two opposite nozzles are alternately open and closed, so that one nozzle is active when the other is inactive and vice-versa, or these blanking members are constantly half-open to allow the gases produced by the generator 9a, 9b to escape.

On the other hand, in flight with high load factor imposing a sudden change of orientation of the path of the missile, it is necessary for at least one of the nozzles 8 to operate fully, in order to obtain this sudden change in orientation. When the member for blanking the or each controlled nozzle is completely retracted, the lateral and transverse gaseous jets F emitted are considerable and interact with the aerodynamic flow E about the missile 1.

If, as in the known systems, the outlet orifice 12 of the nozzles 8 were of circular, square or rectangular and almost square form, i.e. presented a large dimension traverse to axis L—L of the missile, this interaction would result in the separation of the flow E from the fuselage of missile 1 by the or each jet F and the flattening, pluming and incurvation towards the rear of the missile 1 of the or each jet F by the flow E. Consequently, on the one hand, the stability of flight of missile 1 would be affected and, on the other hand, the wings 3, disposed immediately to the rear of the nozzles 8 and although angularly spaced apart therefrom, would be masked from aerodynamic flow E by the piloting jets F, and might be sensitive thereto, so that the lift of said wings 3 and the action of their control surfaces 5 would be cancelled or strongly disturbed. Similarly, the stabilizer 4 and control surfaces 6, disposed far behind the nozzles 8, but in the axis thereof, would at least be masked from flow E. Under these conditions, missile 1 could become uncontrollable.

According to the invention, to avoid these drawbacks, nozzles 8 advantageously present the form shown in FIG. 3. The outlet orifice 12 is oblong in shape, its largest dimension being parallel to the longitudinal axis L—L of missile 1, whilst its smallest dimension is transverse to said axis L—L. This small transverse dimension may be constant and the ends of the outlet orifice 12 may be rounded.

The inlet orifice or neck 11, located on the inside of the missile 1, is also oblong in shape, of constant width and with rounded ends. The section of said neck 11 is similar to that of outlet orifice 12, but smaller than the section of the latter. The diverging section 13 is frusto-pyramidal in shape to provide a smooth transition between the two orifices 11 and 12.

The ratio of cross-sectional area necessary for sufficiently expanding the combustion gases emitted from generator 9a, 9b is obtained to a large extent by determining the respective widths of orifices 11 and 12. However, if, as shown in FIGS. 1 and 3, the outlet orifice 12 is parallel to axis L—L, whilst inlet orifice 11 is inclined with respect to this axis, the variation in length of these two orifices also contributes to obtaining the expansion ratio.

The particular purpose of the inclination of the inlet orifice 11 and the end edges 13a and 13b of the diverging section 13, is to incline the lateral jets F towards the rear of the missile so that said jets create, if necessary, a thrust presenting, in addition to a transverse component for the force-type piloting, an axial component participating in the propulsion of missile 1. This results in the length of the diverging section 13 increasing from front to rear, i.e. from end edge 13a to end edge 13b.

Thanks to the oblong shape of nozzles 8, the lateral piloting jets F present the form of layers having a small frontal dimension to the aerodynamic flow E. Consequently, the above-mentioned interactions between the jets F and the flow Eare, if not totally eliminated, at least sufficiently reduced so as no longer to create harmful effects, with the result that the aerodynamic elements 3, 4, 5 and 6 may continue to perform their function by cooperating with flow E, even when the lateral piloting jets F are used at their maximum power.

In FIGS. 1 and 2, it has been assumed that the outlet orifices 12 of nozzles 8 were located flush with the skin of the fuselage of missile 1. However, in order further to reduce the interactions between flow E and lateral jets F, it may be advantageous in certain cases to guide said lateral jets F beyond the skin of the fuselage of missile 1. For example, as illustrated schematically in FIGS. 4, 5 and 6, the nozzles 8 may project outwardly with respect to the fuselage of missile 1. In the case of FIGS. 4 and 5, a stem 14 has been provided to minimize the disturbances created in the flow E by said projecting nozzles 8. In the case of FIG. 6, the nozzles 8 have been incorporated into sponsons 15 provided on missile 1.

The orifices 11 and 12 and the diverging sections 13 of nozzles 8 are formed in a structure 16 (see FIGS. 7-9 and 11) of missile 1 which withstands the pressure of the gases and in which is arranged a casing 17 for a rotating blanking means 18. The casing 17 and the blanking means 18 lie on the opposed side of the inlet orifice 11 from the diverging section 13 and are coaxial with one another.

The rotating blanking means 18 has the form of a segment of a cylinder having a recess formed therein and its outer cylindrical wall has cut therein a slot 19 whose shape is identical to that of orifice 11. The blanking means 18 can pivot about a pin 20 supported by bearings so as either to bring the slot 19 in total or partial alignment with the orifice 11 (FIGS. 8 and 11 respectively) or to obturate said orifice 11 (FIG. 9). In the position of FIGS. 8 and 11, the gases emitted by generator 9a, 9b and ejected in ducts 10, are transmitted to the diverging sections 13 of nozzles 8 through the recessed part 21 of slot 19 of blanking means 18.

The cylindrical wall of blanking means 18 has a minimum clearance with respect to the casing 17 in order to reduce friction, as well as leakages in closed position (FIG. 9), whilst allowing the expansions provoked by the high temperature of the gases, for example when the latter come from a gas generator 9a, 9b of the powder type. The choice of the materials constituting the casing 17 and the blanking means 18 as well as the choice of their shape may also contribute to minimizing frictions: for example, carbon, molybdenum may be used, optionally protected by coatings or heat-protection sleeves (cf. coating 22 and sleeve 23 in FIGS. 7, 8 and 9).

The radius of the blanking means 18 is reduced so that it presents very low inertia of rotation and clearance for manoeuvre, so as to obtain a very short response time with a minimum control power. The shapes are such that the resultant of the forces exerted on said blanking means passes substantially through its axis of rotation so as to minimize the manoeuvring forces as much as possible.

The control means may be constituted by an electromechanical oscillator of high natural frequency, disposed outside the supply chambers of the nozzles. This oscillator may be constituted for example by antagonistic electromagnets 24 which provoke rotation of the pin 20 by attraction and adhesion of a plate 25 made of magnetic material fixedly secured to said pin 20.

The action of the electro-magnets 24 may be effected against the action of an elastic element exerting a return torque. In the embodiment of FIG. 7, a torsion bar 26, protected by the sleeve 23 and its coating 22, is fixedly secured at its end 27 to pin 20 and at its end 28 to the structure 16. This elastic element may impose a neutral position on the blanking means 18 in the absence of action of the electromagnets. For example, the two positions of the plate 25 adhered to the electromagnet 24 (FIG. 10) may correspond respectively to the opening and closure of the blanking means 18 as illustrated in FIGS. 8 and 9, whilst the neutral position imposed by the elastic element 26 may correspond to a partial opening of blanking means 18, as shown in FIG. 11. As mentioned above, such a partial opening is used to allow evacuation of the gases produced by the generator 9a, 9b whilst inhibiting the action of nozzles 8.

In an advantageous embodiment, the elastic element is constituted by a laminated elastomer bearing forming a seal at the outlet bearing, ensuring all or part of the elastic return.

What is claimed is:

1. A steering system for a missile, said missile having a longitudinal axis and main aerodynamic surfaces disposed on its portion, said steering system comprising:
   a gas generator;
   lateral nozzles disposed adjacent the center of gravity of said missile and connected to the gas generator, each of said lateral nozzles being disposed at an angular position on the periphery of said missile intermediate the angular positions of an adjacent pair of said main aerodynamic surfaces, and each of said nozzles having a substantially oblong cross-section the largest dimension of which lies substantially in a plane including said longitudinal axis and the smallest dimension of which lies substantially perpendicular to said plane, each of said nozzles projecting radially outwardly beyond the fuselage of said missile in order to guide a jet of gas produced by said gas generator and passing through the nozzle outside said fuselage of said missile; and
   movable blanking means for controlling passage through said nozzles of the gas produced by the gas generator.

2. The steering system of claim 1 wherein at least one of said nozzles is incorporated into an auxiliary aerodynamic surface of said missile.

3. The steering system of claim 1 comprising at least two opposed nozzles disposed on opposed sides of the missile at opposite ends of a diameter thereof, each of said two nozzles having a rotatable blanking means associated therewith wherein said rotatable blanking means have a neutral position in which each of said two nozzles is partially open to the same extent, whereby indentical jets of gas pass through each of said two nozzles.

4. The steering system of claim 1 wherein said main aerodynamic surfaces are distributed angularly around the periphery of said missile and wherein each of said nozzles is disposed midway between a pair of adjacent aerodynamic surfaces.

5. The steering system of claim 1 wherein each nozzle comprises a diverging section having an inlet orifice and an outlet orifice, the outlet orifice having a longer cross-section than the inlet orifice and the inlet and outlet orifices lying in planes inclined to one another, the diverging section being frusto-pyramidal in shape and increasing progressively in cross-section from the inlet orifice to the outlet orifice.

6. The steering system of claim 5 wherein said movable blanking means lies adjacent the inlet orifice of each of said nozzles on the opposed sides of said inlet orifice from said diverging section, said movable blanking means having walls defining an opening of substantially the same size and form as the inlet orifice of the nozzzle.

7. The steering system of claim 6 wherein said movable blanking means is rotatable about an axis parallel to the largest dimension of the inlet orifice of the nozzle.

8. A missile provided with a steering system according to claim 1.

* * * * *